(12) United States Patent
McNamara et al.

(10) Patent No.: US 11,220,120 B2
(45) Date of Patent: Jan. 11, 2022

(54) PRINTER ASSEMBLY LOW FRICTION ROLLER LINER

(71) Applicant: SAINT-GOBAIN PERFORMANCE PLASTICS CORPORATION, Solon, OH (US)

(72) Inventors: Brian McNamara, Sixmilebridge (IE); Ian D. Hutcheson, Dublin (IE); Gerard T. Buss, Bedford, NH (US); David A. Rich, Nashua, NH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 217 days.

(21) Appl. No.: 16/718,294

(22) Filed: Dec. 18, 2019

(65) Prior Publication Data

US 2020/0207125 A1    Jul. 2, 2020

Related U.S. Application Data

(60) Provisional application No. 62/785,490, filed on Dec. 27, 2018.

(51) Int. Cl.
*B41J 11/057* (2006.01)
*B32B 27/08* (2006.01)
*B32B 27/32* (2006.01)

(52) U.S. Cl.
CPC .............. *B41J 11/057* (2013.01); *B32B 27/08* (2013.01); *B32B 27/322* (2013.01);
(Continued)

(58) Field of Classification Search
CPC ...... B41J 11/057; B32B 27/08; B32B 27/322; B32B 2327/18; B32B 2250/24; B32B 2307/746; B32B 2250/05; B32B 2250/40
See application file for complete search history.

(56) References Cited

U.S. PATENT DOCUMENTS

| 2,559,750 A | 7/1951 | Berry |
| 2,559,752 A | 7/1951 | Berry |

(Continued)

FOREIGN PATENT DOCUMENTS

| JP | 2014186303 A | 10/2014 |
| JP | 2015132722 A | 7/2015 |

(Continued)

OTHER PUBLICATIONS

International Search Report and Written Opinion for PCT/US2019/067018, dated Apr. 20, 2020, 13 pages.
(Continued)

*Primary Examiner* — Michael C Miggins
(74) *Attorney, Agent, or Firm* — Abel Schillinger, LLP; Chi Suk Kim

(57) ABSTRACT

The present disclosure relates to a low friction roller liner for a printer assembly that may include a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer. The first outer layer and the first inner layer may include a fluoropolymer material and may have a melt flow rate of at least about 2 g/10 min at 372° C. The second outer layer and the second inner layer may include a fluoropolymer material distinct from the fluoropolymer material of the first outer layer and may have a surface coefficient of friction of not greater than about 0.2.

20 Claims, 3 Drawing Sheets

(52) U.S. Cl.
CPC ....... *B32B 2250/05* (2013.01); *B32B 2250/24* (2013.01); *B32B 2307/746* (2013.01); *B32B 2327/18* (2013.01)

(56) References Cited

U.S. PATENT DOCUMENTS

| | | |
|---|---|---|
| 2,833,686 A | 5/1958 | Sandt |
| 2,946,763 A | 7/1960 | Manville et al. |
| 3,179,614 A | 4/1965 | Edwards |
| 3,179,634 A | 4/1965 | Edwards |
| 3,616,177 A | 10/1971 | Gumerman |
| 4,518,938 A | 5/1985 | Bartholomaus et al. |
| 4,628,003 A | 12/1986 | Katz |
| 5,106,673 A | 4/1992 | Effenberger et al. |
| 5,238,748 A | 8/1993 | Effenberger et al. |
| 5,731,088 A | 3/1998 | La Court |
| 6,726,994 B1 | 4/2004 | Araki et al. |
| 7,235,302 B2 | 6/2007 | Jing et al. |
| 7,942,581 B2 | 5/2011 | Leonardelli |
| 8,530,746 B2 * | 9/2013 | Zheng ................ B32B 27/08 174/120 R |
| 9,014,611 B2 | 4/2015 | Ishii et al. |
| 2005/0141797 A1 | 6/2005 | Kinno et al. |
| 2011/0236691 A1 | 9/2011 | Fukumoto et al. |
| 2012/0315418 A1 | 12/2012 | Nakajima et al. |
| 2014/0170409 A1 | 6/2014 | Blackman et al. |
| 2015/0307670 A1 | 10/2015 | Mcnamara et al. |
| 2016/0062280 A1 | 3/2016 | Kinuta |
| 2020/0208681 A1 | 7/2020 | Mcnamara et al. |

FOREIGN PATENT DOCUMENTS

| | | |
|---|---|---|
| KR | 20080012242 A | 2/2008 |
| WO | 2012050929 A2 | 4/2012 |

OTHER PUBLICATIONS

International Search Report and Written Opinion for PCT/US2019/067023, dated Apr. 21, 2020, 9 pages.

* cited by examiner

PRINTER ASSEMBLY LOW FRICTION ROLLER LINER

CROSS-REFERENCE TO RELATED APPLICATION(S)

This Application claims priority under 35 U.S.C. § 119(e) to U.S. Provisional Patent Application No. 62/785,490, entitled "PRINTER ASSEMBLY LOW FRICTION ROLLER LINER," by Brian MCNAMARA et al., filed Dec. 27, 2018, which is assigned to the current assignee hereof and is incorporated herein by reference in its entirety.

FIELD OF THE DISCLOSURE

The present disclosure relates to a low friction roller liner and, in particular, a low friction roller liner for a use in a printer assembly. The present disclosure further relates to a printer assembly that includes the low friction roller liner.

BACKGROUND

Printer assemblies generally include multiple rollers that come into contact with each other and with other components within the printer assembly. Since the moving rollers contact each other, friction between the component parts can cause component fatigue and wear, which can reduce life expectancy of the rollers within the printer assembly. Accordingly, additional components within the printer assembly, i.e., liners, that can reduce friction between the moving components during use are desired.

SUMMARY

According to a first aspect, a low friction roller liner for a printer assembly may include a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer. The first outer layer may include a fluoropolymer material and may have a melt flow rate of at least about 2 g/10 min at 372° C. The second outer layer may include a fluoropolymer material distinct from the fluoropolymer material of the first outer layer and may have a surface coefficient of friction of not greater than about 0.2. The first inner layer may include a fluoropolymer material and may have a melt flow rate of at least about 2 g/10 min at 372° C. The second inner layer may include a fluoropolymer material distinct from the fluoropolymer material of the first outer layer and may have a surface coefficient of friction of not greater than about 0.2.

According to a first aspect, a low friction roller liner for a printer assembly may include a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer. The first outer layer may include at least one of a fluorinated ethylene propylene material, a perfluoroalkoxy alkane material, a modified PTFE material, or a combination thereof. The second outer layer may include a polytetrafluoroethylene material or a mixture of a polytetrafluoroethylene material and a fluorinated ethylene propylene material, a perfluoroalkoxy alkane material, a modified PTFE material. The first inner layer may include a fluorinated ethylene propylene material, a perfluoroalkoxy alkane material, a modified PTFE material, or a combination thereof. The second inner layer may include a polytetrafluoroethylene material or a mixture of a polytetrafluoroethylene material and a fluorinated ethylene propylene material, a perfluoroalkoxy alkane material, a modified PTFE material.

According to yet another aspect, a printer assembly may include a barrel, an armature within the barrel, and a low friction roller liner disposed between an inner surface of the barrel and an outer surface of the armature. The low friction roller liner for a printer assembly may include a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer. The first outer layer may include a fluoropolymer material and may have a melt flow rate of at least about 2 g/10 min at 372° C. The second outer layer may include a fluoropolymer material distinct from the fluoropolymer material of the first outer layer and may have a surface coefficient of friction of not greater than about 0.2. The first inner layer may include a fluoropolymer material and may have a melt flow rate of at least about 2 g/10 min at 372° C. The second inner layer may include a fluoropolymer material distinct from the fluoropolymer material of the first outer layer and may have a surface coefficient of friction of not greater than about 0.2.

According to yet another aspect, a printer assembly may include a barrel, an armature within the barrel, and a low friction roller liner disposed between an inner surface of the barrel and an outer surface of the armature. The low friction roller liner for a printer assembly may include a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer. The first outer layer may include at least one of a fluorinated ethylene propylene material, a perfluoroalkoxy alkane material, a modified PTFE material, or a combination thereof. The second outer layer may include a polytetrafluoroethylene material or a mixture of a polytetrafluoroethylene material and a fluorinated ethylene propylene material, a perfluoroalkoxy alkane material, a modified PTFE material. The first inner layer may include a fluorinated ethylene propylene material, a perfluoroalkoxy alkane material, a modified PTFE material, or a combination thereof. The second inner layer may include a polytetrafluoroethylene material or a mixture of a polytetrafluoroethylene material and a fluorinated ethylene propylene material, a perfluoroalkoxy alkane material, a modified PTFE material.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a low friction roller liner for a printer assembly. According to certain embodiments, the low friction roller liner may include a five component multilayer structure that includes a core layer, a first outer layer overlying a first surface of the core layer, a second outer layer overlying the first outer layer, a first inner layer overlying a second surface of the core layer that is opposite of the first surface of the core layer, and a second inner layer overlying the first inner layer.

Figure 1:
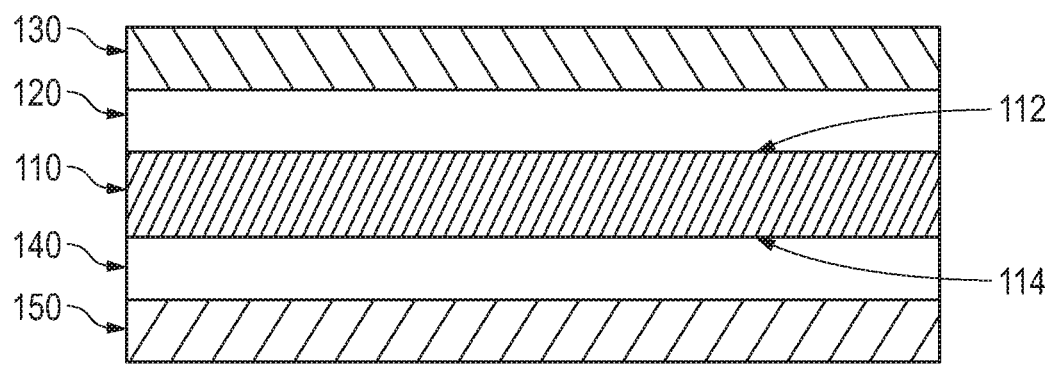
FIG. 1 includes an illustration of a low friction roller liner configuration according to embodiments described herein, FIG. 2 includes an illustration of a printer assembly that includes a low friction roller liner according to embodiments described herein, and FIG. 3 includes a plot of the wear rotations vs. the coefficient of friction for sample low friction bearing liners.

For purposes of illustration, FIG. 1 includes an illustration of a low friction roller liner 100 according to embodiments described herein. As shown in FIG. 1, a low friction roller liner 100 may include a core layer 110, a first outer layer 120 overlying a first surface 112 of the core layer 110, a second outer layer 130 overlying the first outer layer 120, a first inner layer 140 overlying a second surface 114 of the core layer 110 that is opposite of the first surface 112 of the core layer 110, and a second inner layer 150 overlying the first inner layer 140.

According to a certain embodiments, the core layer 110 may include a polyimide material. According to certain embodiments, the core layer 110 may include a particular content of polyimide material. For example, the core layer 110 may include a content of polyimide material of at least about 50 wt. % for a total weight of the core layer 110, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the core layer 110 may include a content of polyimide material of not greater than about 100 wt. % for a total weight of the core layer 110. It will be appreciated that the content of polyimide in the core layer 110 may be within a range between any of the minimum and maximum values noted above. It will be further appreciated that the content of polyimide in the core layer 110 may be any value between any of the minimum and maximum values noted above.

According to still other embodiments, the core layer 110 may consist of a polyimide material.

According to yet other embodiments, the first outer layer 120 may include a fluoropolymer material. According to certain embodiments, the first outer layer 120 may include a particular content of fluoropolymer material. For example, the first outer layer 120 may include a content of fluoropolymer material of at least about 50 wt. % for a total weight of the first outer layer 120, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first outer layer 120 may include a content of fluoropolymer material not greater than about 100 wt. % for a total weight of the first outer layer 120. It will be appreciated that the content of fluoropolymer material in the first outer layer 120 may be within a range between any of the minimum and maximum values noted above. It will be further appreciated that the content of fluoropolymer material in the first outer layer 120 may be any value between any of the minimum and maximum values noted above.

According to still other embodiments, the first outer layer 120 may consist of a fluoropolymer material.

According to still other embodiments, the first outer layer 120 may have a particular melt flow rate. It will be appreciated that for purposes of embodiments described herein, the melt flow rate of a particular material or layer may be measured according to ASTM #D-2116 at a temperature of 372° C. According to certain embodiments, the first outer layer 120 may have a melt flow rate of at least about 2.0 g/10 min.

According to yet other embodiments, the first outer layer 120 may include at least one of a fluorinated ethylene propylene material, a perfluoroalkoxy alkane material, a modified PTFE material, or a combination thereof. According to still other embodiments, the first outer layer 120 may consist of at least about of a fluorinated ethylene propylene material, a perfluoroalkoxy alkane material, a modified PTFE material, or a combination thereof.

According to yet other embodiments, the first outer layer 120 may include a fluorinated ethylene propylene material. According to certain embodiments, the first outer layer 120 may include a particular content of fluorinated ethylene propylene material. For example, the first outer layer 120 may include a content of fluorinated ethylene propylene material of at least about 30 wt. % for a total weight of the first outer layer 120, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first outer layer 120 may include a content of fluorinated ethylene propylene material not greater than about 100 wt. % for a total weight of the first outer layer 120. It will be appreciated that the content of fluorinated ethylene propylene material in the first outer layer 120 may be within a range between any of the minimum and maximum values noted above. It will be further appreciated that the content of fluorinated ethylene propylene material in the first outer layer 120 may be any value between any of the minimum and maximum values noted above.

According to still other embodiments, the first outer layer 120 may consist of a fluorinated ethylene propylene material.

According to yet other embodiments, the first outer layer 120 may include a perfluoroalkoxy alkane material. According to certain embodiments, the first outer layer 120 may include a particular content of perfluoroalkoxy alkane material. For example, the first outer layer 120 may include a content of perfluoroalkoxy alkane material of at least about 30 wt. % for a total weight of the first outer layer 120, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first outer layer 120 may include a content of perfluoroalkoxy alkane material not greater than about 100 wt. % for a total weight of the first outer layer 120. It will be appreciated that the content of perfluoroalkoxy alkane material in the first outer layer 120 may be within a range between any of the minimum and maximum values noted above. It will be further appreciated that the content of perfluoroalkoxy alkane material in the first outer layer 120 may be any value between any of the minimum and maximum values noted above.

According to still other embodiments, the first outer layer 120 may consist of a perfluoroalkoxy alkane material.

According to yet other embodiments, the first outer layer 120 may include a modified PTFE material. According to certain embodiments, the first outer layer 120 may include a particular content of modified PTFE material. For example, the first outer layer 120 may include a content of modified PTFE material of at least about 30 wt. % for a total weight of the first outer layer 120, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first outer layer 120 may include a content of modified PTFE material not greater than about 100 wt. % for a total weight of the first outer layer 120. It will be appreciated that the content of modified PTFE material in the first outer layer 120 may be within a range between any of the minimum and maximum values noted above. It will be further appreciated that the content of modified PTFE material in the first outer layer 120 may be any value between any of the minimum and maximum values noted above.

According to still other embodiments, the first outer layer 120 may consist of a modified PTFE material.

According to still other embodiments, the first outer layer 120 may contact the first surface 112 of the core layer 110. According to still other embodiments, the first outer layer 120 may be bonded to the first surface 112 of the core layer 110. According to yet other embodiments, the first outer layer 120 may be laminated to the first surface 112 of the core layer 110.

According to other embodiments, the second outer layer 130 may include a fluoropolymer material that is distinct from the fluoropolymer material of the first outer layer 120. According to certain embodiments, the second outer layer 130 may include a particular content of fluoropolymer material. For example, the second outer layer 130 may include a content of fluoropolymer material of at least about 50 wt. % for a total weight of the second outer layer 130, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the second outer layer 130 may include a content of fluoropolymer material not greater than about 100 wt. % for a total weight of the second outer layer 130. It will be appreciated that the content of fluoropolymer material in the second outer layer 130 may be within a range between any of the minimum and maximum values noted above. It will be further appreciated that the content of fluoropolymer material in the second outer layer 130 may be any value between any of the minimum and maximum values noted above.

According to still other embodiments, the second outer layer 130 may consist of a fluoropolymer material that is distinct from the fluoropolymer material of the first outer layer 120.

According to yet other embodiments, the second outer layer 130 may have a particular surface coefficient of friction. It will be appreciated that for purposes of embodiments described herein, the surface coefficient of friction of a particular layer may measured under a 9 newton normal force at 260 mm/sec in contact with a quarter inch polyimide wear sphere at a temperature of 140° C. and lubricated with 6,000 cs silicone oil. According to certain embodiments, the second outer layer 130 may have a surface coefficient of friction of not greater than about 0.2, such as, not greater than about 0.15 or not greater than about 0.1 or not greater than about 0.05 or not greater than about 0.04 or not greater than about 0.035 or not greater than about 0.034 or not greater than about 0.033 or not greater than about 0.032 or not greater than about 0.031 or not greater than about 0.031 or not greater than about 0.030 or not greater than about 0.029 or not greater than about 0.028 or not greater than about 0.027 or not greater than about 0.026 or not greater than about 0.025 or not greater than about 0.024 or not greater than about 0.023 or not greater than about 0.022 or not greater than about 0.021 or not greater than about 0.020 or not greater than about 0.019 or not greater than about 0.018 or not greater than about 0.017 or not greater than about 0.016 or even not greater than about 0.015. According to still other embodiments, the second outer layer 130 may have a surface coefficient of friction of at least about 0.010, such as, at least about 0.011 or even at least about 0.012. It will be appreciated that the surface coefficient of friction of the second outer layer 130 may be within a range between any of the minimum and maximum values noted above. It will be further appreciated that the surface coefficient of friction of the second outer layer 130 may be any value between any of the minimum and maximum values noted above.

According to other embodiments, the second outer layer 130 may include at least one of a polytetrafluoroethylene material or a mixture of a polytetrafluoroethylene material and a fluorinated ethylene propylene material, a perfluoroalkoxy alkane material, or a modified PTFE material. According to still embodiments, the second outer layer 130 may consist of at least one of a polytetrafluoroethylene material or a mixture of a polytetrafluoroethylene material and a fluorinated ethylene propylene material, a perfluoroalkoxy alkane material, or a modified PTFE material.

According to yet other embodiments, the second outer layer 130 may include a polytetrafluoroethylene material. According to certain embodiments, the second outer layer 130 may include a particular content of polytetrafluoroethylene material. For example, the second outer layer 130 may include a content of polytetrafluoroethylene material of at least about 50 wt. % for a total weight of the second outer layer 130, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the second outer layer 130 may include a content of not greater than about 100 wt. % for a total weight of the second outer layer 130. It will be appreciated that the content of polytetrafluoroethylene material in the second outer layer 130 may be within a range between any of the minimum and maximum values noted above. It will be further appreciated that the content of polytetrafluoroethylene material in the second outer layer 130 may be any value between any of the minimum and maximum values noted above.

According to still other embodiments, the second outer layer 130 may consist of a second outer layer 130.

According to still other embodiments, the second outer layer 130 may contact the first outer layer 120. According to still other embodiments, the second outer layer 130 may be bonded to the first outer layer 120. According to yet other embodiments, the second outer layer 130 may be laminated to the first outer layer 120.

According to yet other embodiments, the first inner layer 140 may include a fluoropolymer material. According to certain embodiments, the first inner layer 140 may include a particular content of fluoropolymer material. For example, the first inner layer 140 may include a content of fluoropolymer material of at least about 50 wt. % for a total weight of the first inner layer 140, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first inner layer 140 may include a content of fluoropolymer material not greater than about 100 wt. % for a total weight of the first inner layer 140. It will be appreciated that the content of fluoropolymer material in the first inner layer 140 may be within a range between any of the minimum and maximum values noted above. It will be further appreciated that the content of fluoropolymer material in the first inner layer 140 may be any value between any of the minimum and maximum values noted above.

According to still other embodiments, the first inner layer 140 may consist of a fluoropolymer material.

According to still other embodiments, the first inner layer 140 may have a particular melt flow rate. It will be appreciated that for purposes of embodiments described herein, the melt flow rate of a particular material or layer may be measured according to ASTM #D-2116 at a temperature of 372° C. According to certain embodiments, the first inner layer 140 may have a melt flow rate of at least about 2.0 g/10 min.

According to yet other embodiments, the first inner layer 140 may include at least one of a fluorinated ethylene propylene material, a perfluoroalkoxy alkane material, a modified PTFE material, or a combination thereof. According to still other embodiments, the first inner layer 140 may consist of at least about of a fluorinated ethylene propylene material, a perfluoroalkoxy alkane material, a modified PTFE material, or a combination thereof.

According to yet other embodiments, the first inner layer 140 may include a fluorinated ethylene propylene material. According to certain embodiments, the first inner layer 140 may include a particular content of fluorinated ethylene propylene material. For example, the first inner layer 140 may include a content of fluorinated ethylene propylene material of at least about 30 wt. % for a total weight of the first inner layer 140, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or a least about 96 wt. % or a least about 97 wt. % or a least about 98 wt. % or a least about 99 wt. %. According to still other embodiments, the first inner layer 140 may include a content of fluorinated ethylene propylene material not greater than about 100 wt. % for a total weight of the first inner layer 140. It will be appreciated that the content of fluorinated ethylene propylene material in the first inner layer 140 may be within a range between any of the minimum and maximum values noted above. It will be further appreciated that the content of fluorinated ethylene propylene material in the first inner layer 140 may be any value between any of the minimum and maximum values noted above.

According to still other embodiments, the first inner layer 140 may consist of a fluorinated ethylene propylene material.

According to yet other embodiments, the first inner layer 140 may include a perfluoroalkoxy alkane material. According to certain embodiments, the first inner layer 140 may include a particular content of perfluoroalkoxy alkane material. For example, the first inner layer 140 may include a content of perfluoroalkoxy alkane material of at least about 30 wt. % for a total weight of the first inner layer 140, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first inner layer 140 may include a content of perfluoroalkoxy alkane material not greater than about 100 wt. % for a total weight of the first inner layer 140. It will be appreciated that the content of perfluoroalkoxy alkane material in the first inner layer 140 may be within a range between any of the minimum and maximum values noted above. It will be further appreciated that the content of perfluoroalkoxy alkane material in the first inner layer 140 may be any value between any of the minimum and maximum values noted above.

According to still other embodiments, the first inner layer 140 may consist of a perfluoroalkoxy alkane material.

According to yet other embodiments, the first inner layer 140 may include a modified PTFE material. According to certain embodiments, the first inner layer 140 may include a particular content of modified PTFE material. For example, the first inner layer 140 may include a content of modified PTFE material of at least about 30 wt. % for a total weight of the first inner layer 140, such as, at least about 35 wt. % or at least about 40 wt. % or at least about 45 wt. % or at least about 50 wt. % or at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the first inner layer 140 may include a content of modified PTFE material not greater than about 100 wt. % for a total weight of the first inner layer 140. It will be appreciated that the content of modified PTFE material in the first inner layer 140 may be within a range between any of the minimum and maximum values noted above. It will be further appreciated that the content of modified PTFE material in the first inner layer 140 may be any value between any of the minimum and maximum values noted above.

According to still other embodiments, the first inner layer 140 may consist of a modified PTFE material.

According to still other embodiments, the first inner layer 140 may contact the first surface 112 of the core layer 110. According to still other embodiments, the first inner layer 140 may be bonded to the first surface 112 of the core layer 110. According to yet other embodiments, the first inner layer 140 may be laminated to the first surface 112 of the core layer 110.

According to other embodiments, the second inner layer 150 may include a fluoropolymer material that is distinct from the fluoropolymer material of the first inner layer 140. According to certain embodiments, the second inner layer 150 may include a particular content of fluoropolymer material. For example, the second inner layer 150 may include a content of fluoropolymer material of at least about 50 wt. % for a total weight of the second inner layer 150, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the second inner layer 150 may include a content of fluoropolymer material not greater than about 100 wt. % for a total weight of the second inner layer 150. It will be appreciated that the content of fluoropolymer material in the second inner layer 150 may be within a range between any of the minimum and maximum values noted above. It will be further appreciated that the content of fluoropolymer material in the second inner layer 150 may be any value between any of the minimum and maximum values noted above.

According to still other embodiments, the second inner layer 150 may consist of a fluoropolymer material that is distinct from the fluoropolymer material of the first inner layer 140.

According to yet other embodiments, the second inner layer 150 may have a particular surface coefficient of friction. It will be appreciated that for purposes of embodiments described herein, the surface coefficient of friction of a particular layer may be measured under a 9 newton normal force at 260 mm/sec in contact with a quarter inch polyimide wear sphere at a temperature of 140° C. and lubricated with 6,000 cs silicone oil. According to certain embodiments, the second inner layer 150 may have a surface coefficient of friction of not greater than about 0.2, such as, not greater than about 0.15 or not greater than about 0.1 or not greater than about 0.05 or not greater than about 0.04 or not greater than about 0.035 or not greater than about 0.034 or not greater than about 0.033 or not greater than about 0.032 or not greater than about 0.031 or not greater than about 0.031 or not greater than about 0.030 or not greater than about 0.029 or not greater than about 0.028 or not greater than about 0.027 or not greater than about 0.026 or not greater than about 0.025 or not greater than about 0.024 or not greater than about 0.023 or not greater than about 0.022 or not greater than about 0.021 or not greater than about 0.020 or not greater than about 0.019 or not greater than about 0.018 or not greater than about 0.017 or not greater than about 0.016 or even not greater than about 0.015. According to still other embodiments, the second inner layer 150 may have a surface coefficient of friction of at least about 0.010, such as, at least about 0.011 or even at least about 0.012. It will be appreciated that the surface coefficient of friction of the second inner layer 150 may be within a range between any of the minimum and maximum values noted above. It will be further appreciated that the surface coefficient of friction of the second inner layer 150 may be any value between any of the minimum and maximum values noted above.

According to other embodiments, the second inner layer 150 may include at least one of a polytetrafluoroethylene material or a mixture of a polytetrafluoroethylene material and a fluorinated ethylene propylene material, a perfluoroalkoxy alkane material, or a modified PTFE material. According to still embodiments, the second inner layer 150 may consist of at least one of a polytetrafluoroethylene material or a mixture of a polytetrafluoroethylene material and a fluorinated ethylene propylene material, a perfluoroalkoxy alkane material, or a modified PTFE material.

According to yet other embodiments, the second inner layer 150 may include a polytetrafluoroethylene material. According to certain embodiments, the second inner layer 150 may include a particular content of polytetrafluoroethylene material. For example, the second inner layer 150 may include a content of polytetrafluoroethylene material of at least about 50 wt. % for a total weight of the second inner layer 150, such as, at least about 55 wt. % or at least about 60 wt. % or a least about 65 wt. % or a least about 70 wt. % or a least about 75 wt. % or a least about 80 wt. % or a least about 85 wt. % or a least about 90 wt. % or a least about 95 wt. % or at least about 96 wt. % or a least about 97 wt. % or a least about 98 wt. % or a least about 99 wt. %. According to still other embodiments, the second inner layer 150 may include a content of not greater than about 100 wt. % for a total weight of the second inner layer 150. It will be appreciated that the content of polytetrafluoroethylene material in the second inner layer 150 may be within a range between any of the minimum and maximum values noted above. It will be further appreciated that the content of polytetrafluoroethylene material in the second inner layer 150 may be any value between any of the minimum and maximum values noted above.

According to still other embodiments, the second inner layer 150 may consist of a second inner layer 150.

According to still other embodiments, the second inner layer 150 may contact the first inner layer 140. According to still other embodiments, the second inner layer 150 may be bonded to the first inner layer 140. According to yet other embodiments, the second inner layer 150 may be laminated to the first inner layer 140.

According to yet other embodiments, the low friction roller liner 100 may have a particular first outer layer thickness ratio $FOL_T/CL_T$, where $FOL_T$ is equal to a thickness of the first outer layer 120 and $CL_T$ is equal to the thickness of the core layer 110. For example, the low friction roller liner 100 may have a first outer layer thickness ratio $FOL_T/CL_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction roller liner 100 may have a first outer layer thickness ratio $FOL_T/CL_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the first outer layer thickness ratio $FOL_T/CL_T$ of the low friction roller liner 100 may be within a range between any of the minimum and maximum values noted above. It will be further appreciated that the first outer layer thickness ratio $FOL_T/CL_T$ of the low friction roller liner 100 may be any value between any of the minimum and maximum values noted above.

According to yet other embodiments, the low friction roller liner 100 may have a particular second outer layer thickness ratio $SOC_T/CL_T$, where $SOC_T$ is equal to a thickness of the second outer layer 130 and $CL_T$ is equal to the thickness of the core layer 110. For example, the low friction roller liner 100 may have a second outer layer thickness ratio $SOC_T/CL_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction roller liner 100 may have a second outer layer thickness ratio $SOC_T/CL_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the second outer layer thickness ratio $SOC_T/CL_T$ of the low friction roller liner 100 may be within a range between any of the minimum and maximum values noted above. It will be further appreciated that the second outer layer thickness ratio $SOC_T/CL_T$ of the low friction roller liner 100 may be any value between any of the minimum and maximum values noted above.

According to yet other embodiments, the low friction roller liner 100 may have a particular first inner layer thickness ratio $FIL_T/CL_T$, where $FIL_T$ is equal to a thickness of the first inner layer 140 and $CL_T$ is equal to the thickness of the core layer 110. For example, the low friction roller liner 100 may have a first inner layer thickness ratio $FIL_T/CL_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction roller liner 100 may have a first inner layer thickness ratio $FIL_T/CL_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the first inner layer thickness ratio $FIL_T/CL_T$ of the low friction roller liner 100 may be within a range between any of the minimum and maximum values noted above. It will be further appreciated that the first inner layer thickness ratio $FIL_T/CL_T$ of the low friction roller liner 100 may be any value between any of the minimum and maximum values noted above.

According to yet other embodiments, the low friction roller liner 100 may have a particular second inner layer thickness ratio $SIL_T/CL_T$, where $SIL_T$ is equal to a thickness of the second inner layer 150 and $CL_T$ is equal to the thickness of the core layer 110. For example, the low friction roller liner 100 may have a second inner layer thickness ratio $SIL_T/CL_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction roller liner 100 may have a second inner layer thickness ratio $SIL_T/CL_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the second inner layer thickness ratio $SIL_T/CL_T$ of the low friction roller liner 100 may be within a range between any of the minimum and maximum values noted above. It will be further appreciated that the second inner layer thickness ratio $SIL_T/CL_T$ of the low friction roller liner 100 may be any value between any of the minimum and maximum values noted above.

According to yet other embodiments, the core layer 110 may have a particular thickness. For example, the core layer 110 may have a thickness of at least about 10 µm, such as, at least about 15 µm or at least about 20 µm or at least about 25 µm or at least about 30 µm or at least about 35 µm or at least about 40 µm or at least about 45 µm or even at least about 49 µm. According to still other embodiments, the core layer 110 may have a thickness of not greater than about 150 µm, such as, not greater than about 145 µm or not greater than about 140 µm or not greater than about 135 µm or not greater than about 130 µm or not greater than about 125 µm or not greater than about 120 µm or not greater than about 115 µm or not greater than about 110 µm or not greater than about 105 µm or not greater than about 100 µm or not greater than about 95 µm or not greater than about 90 µm or not greater than about 85 µm or not greater than about 80 µm or not greater than about 75 µm or not greater than about 70 µm or not greater than about 65 µm or not greater than about 60 µm or not greater than about 55 µm or not greater than about 50 µm or not greater than about 45 µm or not greater than about 40 µm or not greater than about 35 µm or not greater than about 30 µm or not greater than about 25 µm or not greater than about 20 µm or not greater than about 15 µm or not greater than about 10 µm. It will be appreciated that the thickness of the core layer 110 may be within a range between any of the minimum and maximum values noted above. It will be further appreciated that the thickness of the core layer 110 may be any value between any of the minimum and maximum values noted above.

According to yet other embodiments, the first outer layer 120 may have a particular thickness. For example, the first outer layer 120 may have a thickness of at least about at least about 1 µm, such as, at least about 1.5 µm or at least about 2.0 µm or at least about 2.5 µm or at least about 3.0 µm or at least about 3.5 µm or at least about 4.0 µm or at least about 4.5 µm or even at least about 4.9 µm. According to still other embodiments, the first outer layer 120 may have a thickness of not greater than about 10 µm, such as, not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm. It will be appreciated that the thickness of the first outer layer 120 may be within a range between any of the minimum and maximum values noted above. It will be further appreciated that the thickness of the first outer layer 120 may be any value between any of the minimum and maximum values noted above.

According to yet other embodiments, the second outer layer 130 may have a particular thickness. For example, the second outer layer 130 may have a thickness of at least about at least about 1 µm, such as, at least about 1.5 µm or at least about 2.0 µm or at least about 2.5 µm or at least about 3.0 µm or at least about 3.5 µm or at least about 4.0 µm or at least about 4.5 µm or even at least about 4.9 µm. According to still other embodiments, the second outer layer 130 may have a thickness of not greater than about 10 µm, such as, not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm. It will be appreciated that the thickness of the second outer layer 130 may be within a range between any of the minimum and maximum values noted above. It will be further appreciated that the thickness of the second outer layer 130 may be any value between any of the minimum and maximum values noted above.

According to yet other embodiments, the first inner layer 140 may have a particular thickness. For example, the first inner layer 140 may have a thickness of at least about at least about 1 µm, such as, at least about 1.5 µm or at least about 2.0 µm or at least about 2.5 µm or at least about 3.0 µm or at least about 3.5 µm or at least about 4.0 µm or at least about 4.5 µm or even at least about 4.9 µm. According to still other embodiments, the first inner layer 140 may have a thickness of not greater than about 10 µm, such as, not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm. It will be appreciated that the thickness of the first inner layer 140 may be within a range between any of the minimum and maximum values noted above. It will be further appreciated that the thickness of the first inner layer 140 may be any value between any of the minimum and maximum values noted above.

According to yet other embodiments, the second inner layer 150 may have a particular thickness. For example, the second inner layer 150 may have a thickness of at least about at least about 1 µm, such as, at least about 1.5 µm or at least about 2.0 µm or at least about 2.5 µm or at least about 3.0 µm or at least about 3.5 µm or at least about 4.0 µm or at least about 4.5 µm or even at least about 4.9 µm. According to still other embodiments, the second inner layer 150 may have a thickness of not greater than about 10 µm, such as, not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm. It will be appreciated that the thickness of the second inner layer 150 may be within a range between any of the minimum and maximum values noted above. It will be further appreciated that the thickness of the second inner layer 150 may be any value between any of the minimum and maximum values noted above.

According to still other embodiments, the low friction roller liner 100 may have a particular thickness. For examples, the low friction roller liner 100 may have a thickness of at least about 10 µm, such as, at least about 15 µm or at least about 20 µm or at least about 25 µm or at least about 30 µm or at least about 35 µm or at least about 40 µm or at least about 45 µm or at least about 50 µm or at least about 55 µm or at least about 60 µm or at least about 65 µm or even at least about 69 µm. According to still other embodiments, the low friction roller liner 100 may have a thickness of not greater than about 200 µm, such as, not greater than about 195 µm or not greater than about 190 µm or not greater than about 185 µm or not greater than about 180 µm or not greater than about 175 µm or even not greater than about 170 µm or not greater than about 165 µm or not greater than about 160 µm or not greater than about 155 µm or not greater than about 150 µm or not greater than about 145 µm or not greater than about 140 µm or not greater than about 135 µm or not greater than about 130 µm or not greater than about 125 µm or not greater than about 120 µm or not greater than about 115 µm or not greater than about 110 µm or not greater than about 105 µm or not greater than about 100 µm or not greater than about 95 µm or not greater than about 90 µm or not greater than about 85 µm or not greater than about 80 µm or not greater than about 75 µm or even not greater than about 71 µm. It will be appreciated that the thickness of the low friction roller liner 100 may be within a range between any of the minimum and maximum values noted above. It will be further appreciated that the thickness of the low friction roller liner 100 may be any value between any of the minimum and maximum values noted above.

According to still other embodiments, the low friction roller liner 100 may have a particular wear rating. It will be appreciated that for purposes of embodiments described herein, the wear rating may be tested using a Tribometer Test measured under a 9 newton normal force at 260 mm/sec in contact with a quarter inch polyimide wear sphere at a running temperature of 140° C. and lubricated with 6,000 cs silicone oil. The wear rating is equal to the number of rotations completed before failure in a Tribometer Test and failure is defined as a 50% increase in COF versus steady-state value during the Tribometer test. According to certain embodiments, the low friction roller liner 100 may have a wear rating of at least about 35,000, such as, at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or even at least about 250,000.

According to still other embodiments described herein, the low friction roller liner may be incorporated into a printer assembly.

Figure 2:
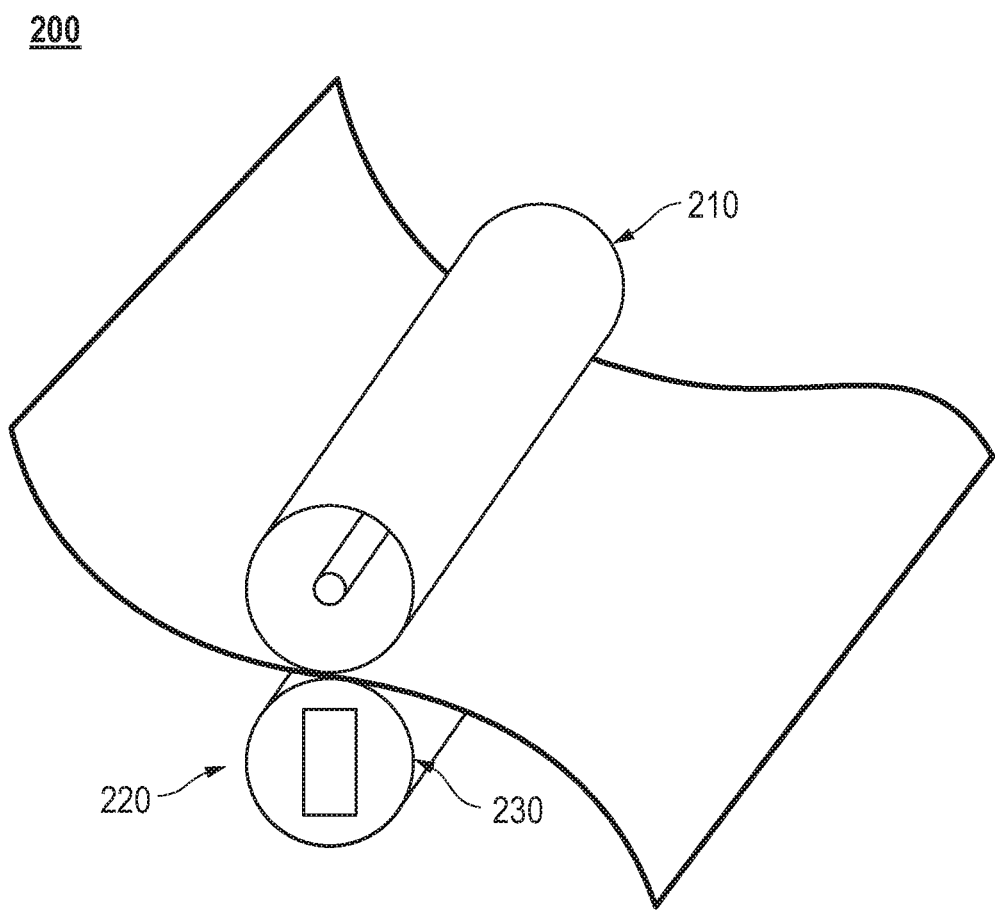

For purposes of illustration, FIG. 2 includes an illustration of a printer assembly 200 according to embodiments described herein. As shown in FIG. 2, a printer assembly 200 may include a printer fuser roller 210, a free belt slip roller 220 and a low friction roller liner 230 disposed between printer fuser roller 210 of the printer assembly 200 and the free belt slip roller 220 of the printer assembly 210.

According to still other embodiments, it will be appreciated that the low friction roller liner 230 of the printer assembly 200, as shown in FIG. 2, may include any of the components and may be described as having any of the characteristics described herein with reference to the low friction roller liner 100 as shown in FIG. 1. In particular, the low friction roller liner 230 of the printer assembly 200 as shown in FIG. 2, may include, as shown in FIG. 1, a core layer 110, a first outer layer 120 overlying a first surface 112 of the core layer 110, a second outer layer 130 overlying the first outer layer 120, a first inner layer 140 overlying a second surface 114 of the core layer 110 that is opposite of the first surface 112 of the core layer 110, and a second inner layer 150 overlying the first inner layer 140.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A low friction roller liner for a printer assembly, wherein the low friction roller liner comprises: a core layer comprising a polyimide material; a first outer layer overlying a first surface of the core layer, wherein the first outer layer comprises a fluoropolymer material, and wherein the first outer layer has a melt flow rate of at least about 2 g/10 min at 372° C.; a second outer layer overlying the first outer layer, wherein the second outer layer comprises a fluoropolymer material distinct from the fluoropolymer material of the first outer layer and wherein the first outer layer has a surface coefficient of friction of not greater than about 0.2; a first inner layer overlying a second surface of the core layer, wherein the second surface is opposite of the first surface, wherein the first inner layer comprises a fluoropolymer material, and wherein the first inner layer has a melt flow rate of at least about 2 g/10 min at 372° C.; and a second inner layer overlying the first inner layer, wherein the second inner layer comprises a fluoropolymer material distinct from the fluoropolymer material of the first inner layer and wherein the first inner layer has a surface coefficient of friction of not greater than about 0.2.

Embodiment 2. A low friction roller liner for a printer assembly, wherein the low friction roller liner comprises: a core layer comprising a polyimide material; a first outer layer overlying a first surface of the core layer, wherein the first outer layer comprises at least one of a fluorinated ethylene propylene material, a perfluoroalkoxy alkane material, a modified PTFE material, or a combination thereof; a second outer layer overlying the first outer layer, wherein the second outer layer comprises a polytetrafluoroethylene material or a mixture of a olytetrafluoroethylene material and a fluorinated ethylene propylene material, a perfluoroalkoxy alkane material, a modified PTFE material; a first inner layer overlying a second surface of the core layer, wherein the second surface is opposite of the first surface, wherein the first inner layer comprises at least one of a fluorinated ethylene propylene material, a perfluoroalkoxy alkane material, a modified PTFE material, or a combination thereof; and a second inner layer overlying the first inner layer, wherein the second inner layer comprises a polytetrafluoroethylene material or a mixture of a polytetrafluoroethylene material and a fluorinated ethylene propylene material, a perfluoroalkoxy alkane material, a modified PTFE material.

Embodiment 3. The low friction roller liner of embodiment 2, wherein the first outer layer has a melt flow rate of at least about 2 g/10 min at 372° C.

Embodiment 4. The low friction roller liner of embodiment 2, wherein the first outer layer has a surface coefficient of friction of not greater than about 0.2.

Embodiment 5. The low friction roller liner of embodiment 2, wherein the first inner layer has a melt flow rate of at least about 2 g/10 min at 372° C.

Embodiment 6. The low friction roller liner of embodiment 2, wherein the first inner layer has a surface coefficient of friction of not greater than about 0.2.

Embodiment 7. The low friction roller liner of embodiment 1, wherein the first outer layer comprises at least one of a fluorinated ethylene propylene material, a perfluoroalkoxy alkane material, a modified PTFE material, or a combination thereof.

Embodiment 8. The low friction roller liner of embodiment 1, wherein the second outer layer comprises a polytetrafluoroethylene material or a mixture of a polytetrafluoroethylene material and a fluorinated ethylene propylene material, a perfluoroalkoxy alkane material, a modified PTFE material.

Embodiment 9. The low friction roller liner of embodiment 1, wherein the first inner layer comprises at least one of a fluorinated ethylene propylene material, a perfluoroalkoxy alkane material, a modified PTFE material, or a combination thereof.

Embodiment 10. The low friction roller liner of embodiment 1, wherein the second inner layer comprises a polytetrafluoroethylene material or a mixture of a polytetrafluoroethylene material and a fluorinated ethylene propylene material, a perfluoroalkoxy alkane material, a modified PTFE material.

Embodiment 11. The low friction roller liner of any one of embodiments 1 and 2, further comprising a wear rating of at least about 32,000, where the wear rating is equal to the number of rotations completed before failure in a Tribometer Test and failure is defined as a 50% increase in COF versus steady-state value during the Tribometer test, or at least about 35,000 or at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or at least about 250,000.

Embodiment 12. The low friction roller liner of any one of embodiments 1 and 2, wherein the core layer consists of a polyimide material.

Embodiment 13. The low friction roller liner of any one of embodiments 1 and 2, wherein the first outer layer consists of a fluorinated ethylene propylene material.

Embodiment 14. The low friction roller liner of any one of embodiments 1 and 2, wherein the second outer layer consists of a polytetrafluoroethylene material.

Embodiment 15. The low friction roller liner of any one of embodiments 1 and 2, wherein the first inner layer consists of a fluorinated ethylene propylene material.

Embodiment 16. The low friction roller liner of any one of embodiments 1 and 2, wherein the second inner layer consists of a polytetrafluoroethylene material.

Embodiment 17. The low friction roller liner of any one of embodiments 1 and 2, wherein the first outer layer contacts the first surface of the core layer.

Embodiment 18. The low friction roller liner of any one of embodiments 1 and 2, wherein the first outer layer is bonded to the first surface of the core layer.

Embodiment 19. The low friction roller liner of any one of embodiments 1 and 2, wherein the second outer layer contacts the first outer layer.

Embodiment 20. The low friction roller liner of any one of embodiments 1 and 2, wherein the second outer layer is bonded to the first outer layer.

Embodiment 21. The low friction roller liner of any one of embodiments 1 and 2, wherein the first inner layer contacts the first surface of the core layer.

Embodiment 22. The low friction roller liner of any one of embodiments 1 and 2, wherein the first inner layer is bonded to the first surface of the core layer.

Embodiment 23. The low friction roller liner of any one of embodiments 1 and 2, wherein the second inner layer contacts the first outer layer.

Embodiment 24. The low friction roller liner of any one of embodiments 1 and 2, wherein the second inner layer is bonded to the first outer layer.

Embodiment 25. The low friction roller liner of any one of embodiments 1 and 2, further comprising a first outer layer thickness ratio $FOL_T/CL_T$ of at least about 0.02, where $FOL_T$ is equal to the thickness of the first outer layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 26. The low friction roller liner of any one of embodiments 1 and 2, further comprising a first outer layer thickness ratio $FOL_T/CL_T$ of not greater than about 0.4, where $FOL_T$ is equal to the thickness of the first outer layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 27. The low friction roller liner of any one of embodiments 1 and 2, further comprising a second outer layer thickness ratio $SOL_T/CL_T$ of at least about 0.02, where $SOL_T$ is equal to the thickness of the second outer layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 28. The low friction roller liner of any one of embodiments 1 and 2, further comprising a second outer layer thickness ratio $SOL_T/CL_T$ of not greater than about 0.4, where $SOL_T$ is equal to the thickness of the second outer layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 29. The low friction roller liner of any one of embodiments 1 and 2, further comprising a first inner layer thickness ratio $FIL_T/CL_T$ of at least about 0.02, where $FIL_T$ is equal to the thickness of the first inner layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 30. The low friction roller liner of any one of embodiments 1 and 2, comprising a first inner layer thickness ratio $FIL_T/CL_T$ of not greater than about 0.4, where $FIL_T$ is equal to the thickness of the first inner layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 31. The low friction roller liner of any one of embodiments 1 and 2, further comprising a second inner layer thickness ratio $SIL_T/CL_T$ of at least about 0.02, where $SIL_T$ is equal to the thickness of the second inner layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 32. The low friction roller liner of any one of embodiments 1 and 2, further comprising a second inner layer thickness ratio $SIL_T/CL_T$ of not greater than about 0.4, where $SIL_T$ is equal to the thickness of the second inner layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 33. The low friction roller liner of any one of embodiments 1 and 2, wherein the core layer has a thickness of at least about at least about 10 µm or at least about 15 µm or at least about 20 µm or at least about 25 µm or at least about 30 µm or at least about 35 µm or at least about 40 µm or at least about 45 µm or even at least about 49 µm.

Embodiment 34. The low friction roller liner of any one of embodiments 1 and 2, wherein the core layer has a thickness of not greater than about 150 µm or not greater than about 145 µm or not greater than about 140 µm or not greater than about 135 µm or not greater than about 130 µm or not greater than about 125 µm or not greater than about 120 µm or not greater than about 115 µm or not greater than about 110 µm or not greater than about 105 µm or not greater than about 100 µm or not greater than about 95 µm or not greater than about 90 µm or not greater than about 85 µm or not greater than about 80 µm or not greater than about 75 µm or not greater than about 70 µm or not greater than about 65 µm or not greater than about 60 µm or not greater than about 55 µm or not greater than about 50 µm or not greater than about 45 µm or not greater than about 40 µm or not greater than about 35 µm or not greater than about 30 µm or not greater than about 25 µm or not greater than about 20 µm or not greater than about 15 µm or not greater than about 10 µm.

Embodiment 35. The low friction roller liner of any one of embodiments 1 and 2, wherein the first outer layer has a thickness of at least about 1 µm or at least about 1.5 µm or at least about 2.0 µm or at least about 2.5 µm or at least about 3.0 µm or at least about 3.5 µm or at least about 4.0 µm or at least about 4.5 µm or at least about 4.9 µm.

Embodiment 36. The low friction roller liner of any one of embodiments 1 and 2, wherein the first outer layer has a thickness of not greater than about 10 µm or not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm.

Embodiment 37. The low friction roller liner of any one of embodiments 1 and 2, wherein the second outer layer has a thickness of at least about 1 µm or at least about 1.5 µm or at least about 2.0 µm or at least about 2.5 µm or at least about 3.0 µm or at least about 3.5 µm or at least about 4.0 µm or at least about 4.5 µm or at least about 4.9 µm.

Embodiment 38. The low friction roller liner of any one of embodiments 1 and 2, wherein the second outer layer has a thickness of not greater than about 10 µm or not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm.

Embodiment 39. The low friction roller liner of any one of embodiments 1 and 2, wherein the first inner layer has a thickness of at least about 1 µm or at least about 1.5 µm or at least about 2.0 µm or at least about 2.5 µm or at least about 3.0 µm or at least about 3.5 µm or at least about 4.0 µm or at least about 4.5 µm or at least about 4.9 µm.

Embodiment 40. The low friction roller liner of any one of embodiments 1 and 2, wherein the first inner layer has a thickness of not greater than about 10 µm or not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm.

Embodiment 41. The low friction roller liner of any one of embodiments 1 and 2, wherein the second inner layer has a thickness of at least about 1 µm or at least about 1.5 µm or at least about 2.0 µm or at least about 2.5 µm or at least about 3.0 µm or at least about 3.5 µm or at least about 4.0 µm or at least about 4.5 µm or at least about 4.9 µm.

Embodiment 42. The low friction roller liner of any one of embodiments 1 and 2, wherein the second inner layer has a thickness of not greater than about 10 µm or not greater than about 9.5 µm or not greater than about 9.0 µm or not greater than about 8.5 µm or not greater than about 8.0 µm or not greater than about 7.5 µm or not greater than about 7.0 µm or not greater than about 6.5 µm or not greater than about 6.0 µm or not greater than about 5.5 µm or not greater than about 5.1 µm.

Embodiment 43. The low friction roller liner of any one of embodiments 1 and 2, wherein the low friction roller liner has a thickness of at least about 10 µm or at least about 15 µm or at least about 20 µm or at least about 25 µm or at least about 30 µm or at least about 35 µm or at least about 40 µm or at least about 45 µm or at least about 50 µm or at least about 55 µm or at least about 60 µm or at least about 65 µm or even at least about 69 µm.

Embodiment 44. The low friction roller liner of any one of embodiments 1 and 2, wherein the low friction roller liner has a thickness of not greater than about 200 µm or not greater than about 195 µm or not greater than about 190 µm or not greater than about 185 µm or not greater than about 180 µm or not greater than about 175 µm or even not greater than about 170 µm or not greater than about 165 µm or not greater than about 160 µm or not greater than about 155 µm or not greater than about 150 µm or not greater than about 145 µm or not greater than about 140 µm or not greater than about 135 µm or not greater than about 130 µm or not greater than about 125 µm or not greater than about 120 µm or not greater than about 115 µm or not greater than about 110 µm or not greater than about 105 µm or not greater than about 100 µm or not greater than about 95 µm or not greater than about 90 µm or not greater than about 85 µm or not greater than about 80 µm or not greater than about 75 µm or even not greater than about 71 µm.

Embodiment 45. A printer assembly comprising: a printer fuser printer roller; and a free belt slip printer roller comprising low friction roller liner, wherein the low friction roller liner comprises: a core layer comprising a polyimide material; a first outer layer overlying a first surface of the core layer, wherein the first outer layer comprises a fluoropolymer material, and wherein the first outer layer has a melt flow rate of at least about 2 g/10 min at 372° C.; a second outer layer overlying the first outer layer, wherein the second outer layer comprises a fluoropolymer material distinct from the fluoropolymer material of the first outer layer and wherein the first outer layer has a surface coefficient of friction of not greater than about 0.2; a first inner layer overlying a second surface of the core layer, wherein the second surface is opposite of the first surface, wherein the first inner layer comprises a fluoropolymer material, and wherein the first inner layer has a melt flow rate of at least about 2 g/10 min at 372° C.; and a second inner layer overlying the first inner layer, wherein the second inner layer comprises a fluoropolymer material distinct from the fluoropolymer material of the first inner layer and wherein the first inner layer has a surface coefficient of friction of not greater than about 0.2.

Embodiment 46. A printer assembly comprising: a printer fuser printer roller; and a free belt slip printer roller comprising low friction roller liner, wherein the low friction roller liner comprises: a core layer comprising a polyimide material; a first outer layer overlying a first surface of the core layer, wherein the first outer layer comprises at least one of a fluorinated ethylene propylene material, a perfluoroalkoxy alkane material, a modified PTFE material, or a combination thereof; a second outer layer overlying the first outer layer, wherein the second outer layer comprises a polytetrafluoroethylene material or a mixture of a polytetrafluoroethylene material and a fluorinated ethylene propylene material, a perfluoroalkoxy alkane material, a modified PTFE material; a first inner layer overlying a second surface of the core layer, wherein the second surface is opposite of the first surface, wherein the first inner layer comprises at least one of a fluorinated ethylene propylene material, a perfluoroalkoxy alkane material, a modified PTFE material, or a combination thereof; and a second inner layer overlying the first inner layer, wherein the second inner layer comprises a polytetrafluoroethylene material or a mixture of a polytetrafluoroethylene material and a fluorinated ethylene propylene material, a perfluoroalkoxy alkane material, a modified PTFE material.

Embodiment 47. The printer assembly of any one of embodiments 45 and 46, wherein the low friction roller liner is attached to the free belt slip printer roller.

Embodiment 48. The printer assembly of embodiment 46, wherein the first outer layer has a melt flow rate of at least about 2 g/10 min at 372° C.

Embodiment 49. The printer assembly of embodiment 46, wherein the first outer layer has a surface coefficient of friction of not greater than about 0.2.

Embodiment 50. The printer assembly of embodiment 46, wherein the first inner layer has a melt flow rate of at least about 2 g/10 min at 372° C.

Embodiment 51. The printer assembly of embodiment 46, wherein the first inner layer has a surface coefficient of friction of not greater than about 0.2.

Embodiment 52. The printer assembly of embodiment 45, wherein the first outer layer comprises at least one of a fluorinated ethylene propylene material, a perfluoroalkoxy alkane material, a modified PTFE material, or a combination thereof.

Embodiment 53. The printer assembly of embodiment 45, wherein the second outer layer comprises a polytetrafluoroethylene material or a mixture of a polytetrafluoroethylene material and a fluorinated ethylene propylene material, a perfluoroalkoxy alkane material, a modified PTFE material.

Embodiment 54. The printer assembly of embodiment 45, wherein the first inner layer comprises at least one of a fluorinated ethylene propylene material, a perfluoroalkoxy alkane material, a modified PTFE material, or a combination thereof.

Embodiment 55. The printer assembly of embodiment 45, wherein the second inner layer comprises a polytetrafluoroethylene material or a mixture of a polytetrafluoroethylene material and a fluorinated ethylene propylene material, a perfluoroalkoxy alkane material, a modified PTFE material.

Embodiment 56. The printer assembly of any one of embodiments 45 and 46, wherein low friction roller liner comprises a wear rating of at least about 32,000, where the wear rating is equal to the number of rotations completed before failure in a Tribometer Test and failure is defined as a 50% increase in COF versus steady-state value during the Tribometer test, or at least about 35,000 or at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or at least about 250,000.

Embodiment 57. The printer assembly of any one of embodiments 45 and 46, wherein the core layer consists of a polyimide material.

Embodiment 58. The printer assembly of any one of embodiments 45 and 46, wherein the first outer layer consists of a fluorinated ethylene propylene material.

Embodiment 59. The printer assembly of any one of embodiments 45 and 46, wherein the second outer layer consists of a polytetrafluoroethylene material.

Embodiment 60. The printer assembly of any one of embodiments 45 and 46, wherein the first inner layer consists of a fluorinated ethylene propylene material.

Embodiment 61. The printer assembly of any one of embodiments 45 and 46, wherein the second inner layer consists of a polytetrafluoroethylene material.

Embodiment 62. The printer assembly of any one of embodiments 45 and 46, wherein the first outer layer contacts the first surface of the core layer.

Embodiment 63. The printer assembly of any one of embodiments 45 and 46, wherein the first outer layer is bonded to the first surface of the core layer.

Embodiment 64. The printer assembly of any one of embodiments 45 and 46, wherein the second outer layer contacts the first outer layer.

Embodiment 65. The printer assembly of any one of embodiments 45 and 46, wherein the second outer layer is bonded to the first outer layer.

Embodiment 66. The printer assembly of any one of embodiments 45 and 46, wherein the first inner layer contacts the first surface of the core layer.

Embodiment 67. The printer assembly of any one of embodiments 45 and 46, wherein the first inner layer is bonded to the first surface of the core layer.

Embodiment 68. The printer assembly of any one of embodiments 45 and 46, wherein the second inner layer contacts the first outer layer.

Embodiment 69. The printer assembly of any one of embodiments 45 and 46, wherein the second inner layer is bonded to the first outer layer.

Embodiment 70. The printer assembly of any one of embodiments 45 and 46, wherein the low friction roller liner comprises a first outer layer thickness ratio $FOL_T/CL_T$ of at least about 0.02, where $FOL_T$ is equal to the thickness of the first outer layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 71. The printer assembly of any one of embodiments 45 and 46, wherein the low friction roller liner comprises a first outer layer thickness ratio $FOL_T/CL_T$ of not greater than about 0.4, where $FOL_T$ is equal to the thickness of the first outer layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 72. The printer assembly of any one of embodiments 45 and 46, wherein the low friction roller liner comprises a second outer layer thickness ratio $SOL_T/CL_T$ of at least about 0.02, where $SOL_T$ is equal to the thickness of the second outer layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 73. The printer assembly of any one of embodiments 45 and 46, wherein the low friction roller liner comprises a second outer layer thickness ratio $SOL_T/CL_T$ of not greater than about 0.4, where $SOL_T$ is equal to the thickness of the second outer layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 74. The printer assembly of any one of embodiments 45 and 46, wherein the low friction roller liner comprises a first inner layer thickness ratio $FIL_T/CL_T$ of at least about 0.02, where $FIL_T$ is equal to the thickness of the first outer layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 75. The printer assembly of any one of embodiments 45 and 46, wherein the low friction roller liner comprises a first inner layer thickness ratio $FIL_T/CL_T$ of not greater than about 0.4, where $FIL_T$ is equal to the thickness of the first inner layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 76. The printer assembly of any one of embodiments 45 and 46, wherein the low friction roller liner comprises a second inner layer thickness ratio $SIL_T/CL_T$ of at least about 0.02, where $SIL_T$ is equal to the thickness of the second inner layer and $CL_T$ is equal to the thickness of the core layer, at least about 0.03 or at least about 0.04 or at least about 0.05 or at least about 0.06 or at least about 0.07 or at least about 0.08 or at least about 0.09.

Embodiment 77. The printer assembly of any one of embodiments 45 and 46, wherein the low friction roller liner comprises a second inner layer thickness ratio $SIL_T/CL_T$ of not greater than about 0.4, where $SIL_T$ is equal to the thickness of the second inner layer and $CL_T$ is equal to the thickness of the core layer, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11.

Embodiment 78. The printer assembly of any one of embodiments 45 and 46, wherein the core layer has a thickness of at least about at least about 10 μm or at least about 15 μm or at least about 20 μm or at least about 25 μm or at least about 30 μm or at least about 35 μm or at least about 40 μm or at least about 45 μm or even at least about 49 μm.

Embodiment 79. The printer assembly of any one of embodiments 45 and 46, wherein the core layer has a thickness of not greater than about 150 μm or not greater than about 145 μm or not greater than about 140 μm or not greater than about 135 μm or not greater than about 130 μm or not greater than about 125 μm or not greater than about 120 μm or not greater than about 115 μm or not greater than about 110 μm or not greater than about 105 μm or not greater than about 100 μm or not greater than about 95 μm or not greater than about 90 μm or not greater than about 85 μm or not greater than about 80 μm or not greater than about 75 μm or not greater than about 70 μm or not greater than about 65 μm or not greater than about 60 μm or not greater than about 55 μm or not greater than about 50 μm or not greater than about 45 μm or not greater than about 40 μm or not greater than about 35 μm or not greater than about 30 μm or not greater than about 25 μm or not greater than about 20 μm or not greater than about 15 μm or not greater than about 10 μm.

Embodiment 80. The printer assembly of any one of embodiments 45 and 46, wherein the first outer layer has a thickness of at least about 1 μm or at least about 1.5 μm or at least about 2.0 μm or at least about 2.5 μm or at least about 3.0 μm or at least about 3.5 μm or at least about 4.0 μm or at least about 4.5 μm or at least about 4.9 μm.

Embodiment 81. The printer assembly of any one of embodiments 45 and 46, wherein the first outer layer has a thickness of not greater than about 10 μm or not greater than about 9.5 μm or not greater than about 9.0 μm or not greater than about 8.5 μm or not greater than about 8.0 μm or not greater than about 7.5 μm or not greater than about 7.0 μm or not greater than about 6.5 μm or not greater than about 6.0 μm or not greater than about 5.5 μm or not greater than about 5.1 μm.

Embodiment 82. The printer assembly of any one of embodiments 45 and 46, wherein the second outer layer has a thickness of at least about 1 μm or at least about 1.5 μm or at least about 2.0 μm or at least about 2.5 μm or at least about 3.0 μm or at least about 3.5 μm or at least about 4.0 μm or at least about 4.5 μm or at least about 4.9 μm.

Embodiment 83. The printer assembly of any one of embodiments 45 and 46, wherein the second outer layer has a thickness of not greater than about 10 μm or not greater than about 9.5 μm or not greater than about 9.0 μm or not greater than about 8.5 μm or not greater than about 8.0 μm or not greater than about 7.5 μm or not greater than about 7.0 μm or not greater than about 6.5 μm or not greater than about 6.0 μm or not greater than about 5.5 μm or not greater than about 5.1 μm.

Embodiment 84. The printer assembly of any one of embodiments 45 and 46, wherein the first inner layer has a thickness of at least about 1 μm or at least about 1.5 μm or at least about 2.0 μm or at least about 2.5 μm or at least about 3.0 μm or at least about 3.5 μm or at least about 4.0 μm or at least about 4.5 μm or at least about 4.9 μm.

Embodiment 85. The printer assembly of any one of embodiments 45 and 46, wherein the first inner layer has a thickness of not greater than about 10 μm or not greater than about 9.5 μm or not greater than about 9.0 μm or not greater than about 8.5 μm or not greater than about 8.0 μm or not greater than about 7.5 μm or not greater than about 7.0 μm or not greater than about 6.5 μm or not greater than about 6.0 μm or not greater than about 5.5 μm or not greater than about 5.1 μm.

Embodiment 86. The printer assembly of any one of embodiments 45 and 46, wherein the second inner layer has a thickness of at least about 1 μm or at least about 1.5 μm or at least about 2.0 μm or at least about 2.5 μm or at least about 3.0 μm or at least about 3.5 μm or at least about 4.0 μm or at least about 4.5 μm or at least about 4.9 μm.

Embodiment 87. The printer assembly of any one of embodiments 45 and 46, wherein the second inner layer has a thickness of not greater than about 10 μm or not greater than about 9.5 μm or not greater than about 9.0 μm or not greater than about 8.5 μm or not greater than about 8.0 μm or not greater than about 7.5 μm or not greater than about 7.0 μm or not greater than about 6.5 μm or not greater than about 6.0 μm or not greater than about 5.5 μm or not greater than about 5.1 μm.

Embodiment 88. The printer assembly of any one of embodiments 45 and 46, wherein the low friction roller liner has a thickness of at least about 10 μm or at least about 15 μm or at least about 20 μm or at least about 25 μm or at least about 30 μm or at least about 35 μm or at least about 40 μm or at least about 45 μm or at least about 50 μm or at least about 55 μm or at least about 60 μm or at least about 65 μm or even at least about 69 μm.

Embodiment 89. The printer assembly of any one of embodiments 45 and 46, wherein the low friction roller liner has a thickness of not greater than about 200 μm or not greater than about 195 μm or not greater than about 190 μm or not greater than about 185 μm or not greater than about 180 μm or not greater than about 175 μm or even not greater than about 170 μm or not greater than about 165 μm or not greater than about 160 μm or not greater than about 155 μm or not greater than about 150 μm or not greater than about 145 μm or not greater than about 140 μm or not greater than about 135 μm or not greater than about 130 μm or not greater than about 125 μm or not greater than about 120 μm or not greater than about 115 μm or not greater than about 110 μm or not greater than about 105 μm or not greater than about 100 μm or not greater than about 95 μm or not greater than about 90 μm or not greater than about 85 μm or not greater than about 80 μm or not greater than about 75 μm or even not greater than about 71 μm.

EXAMPLES

The concepts described herein will be further described in the following Examples, which do not limit the scope of the invention described in the claims.

Example 1

A sample low friction liner S1 was formed according to embodiments described herein. The sample low friction liner had a core layer of polyimide material with a thickness of 50 μm. Both sides of the core layer were coated with layers of FEP material. The layers of FEP material both had a thickness of 5 μm. Both outer sides of the FEP material were then coated with layers of PTFE material. The layers of PTFE material both had a thickness of 5 μm.

Two comparative sample low friction liners CS1 and CS2 were used for performance comparison. Comparative sample CS1 had a fabric core and was coated with a layer of cast PTFE. The total thickness of the comparative sample CS1 was 150 μm. Comparative sample CS2 had a fabric core and was coated with a layer of modified PTFE. The total thickness of the comparative sample CS2 was 150 μm.

Sample S1 and comparative samples CS1 were tested to determine their coefficient of frictions and wear rating using a Tribometer Test measured under a 9 newton normal force at 260 mm/sec in contact with a quarter inch polyimide wear sphere at a running temperature of 140° C. and lubricated with 6,000 cs silicone oil.

Figure 3:
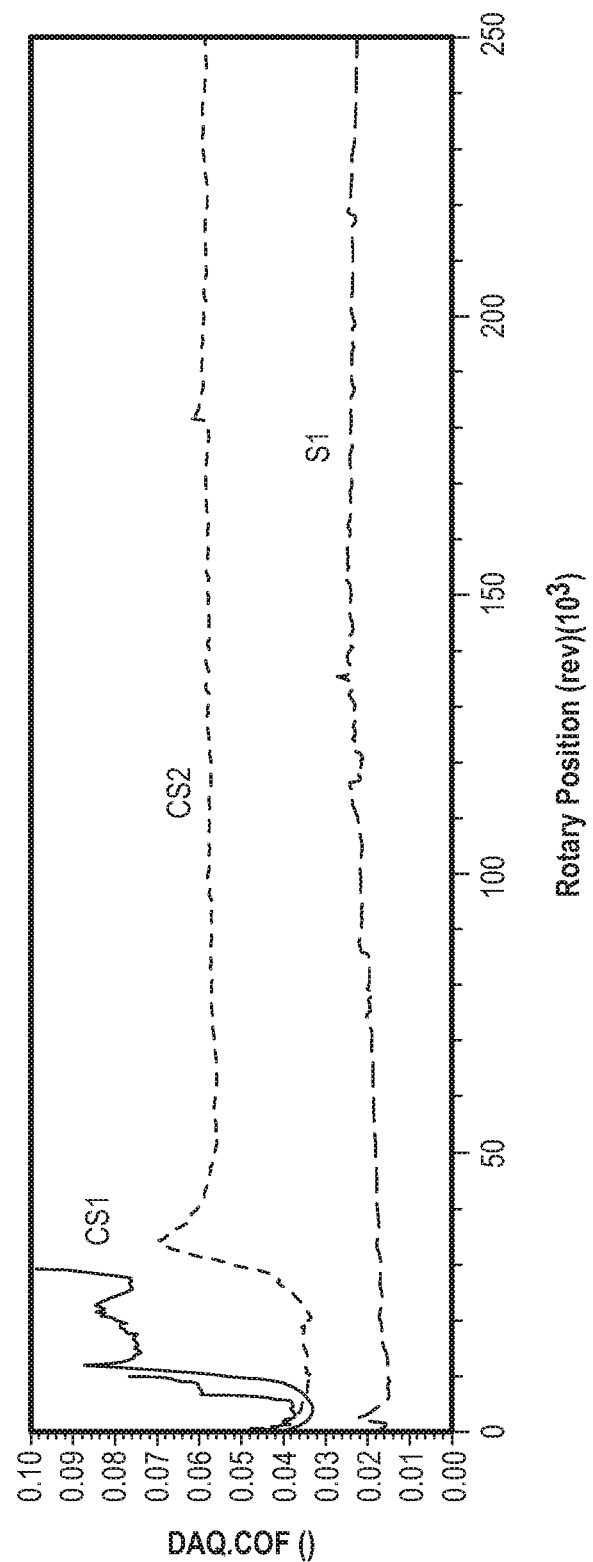

FIG. 3 includes a plot of the wear rotations vs. the coefficient of friction for the sample S1 and comparative samples CS1 and CS2. The results of the comparison tests are shown in table 1 below.

TABLE 1

COF and Wear Life Comparison

| Sample | COF | Wear Rating |
|---|---|---|
| S1 | 0.023 | >250,000 |
| CS1 | 0.034 | 9,700 |
| CS1 | 0.040 | 29,500 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A low friction roller liner for a printer assembly, wherein the low friction roller liner comprises:
   a core layer comprising a polyimide material;
   a first outer layer overlying a first surface of the core layer, wherein the first outer layer comprises a fluoropolymer material, and wherein the first outer layer has a melt flow rate of at least about 2 g/10 min at 372° C.;
   a second outer layer overlying the first outer layer, wherein the second outer layer comprises a fluoropolymer material distinct from the fluoropolymer material of the first outer layer and wherein the first outer layer has a surface coefficient of friction of not greater than about 0.2;
   a first inner layer overlying a second surface of the core layer, wherein the second surface is opposite of the first surface, wherein the first inner layer comprises a fluoropolymer material, and wherein the first inner layer has a melt flow rate of at least about 2 g/10 min at 372° C.; and
   a second inner layer overlying the first inner layer, wherein the second inner layer comprises a fluoropolymer material distinct from the fluoropolymer material of the first inner layer and wherein the first inner layer has a surface coefficient of friction of not greater than about 0.2.

2. The low friction roller liner of claim 1, wherein the first outer layer comprises at least one of a fluorinated ethylene propylene material, a perfluoroalkoxy alkane material, a modified PTFE material, or a combination thereof.

3. The low friction roller liner of claim 1, wherein the second outer layer comprises a polytetrafluoroethylene material or a mixture of a polytetrafluoroethylene material and a fluorinated ethylene propylene material, a perfluoroalkoxy alkane material, a modified PTFE material.

4. The low friction roller liner of claim 1, wherein the first inner layer comprises at least one of a fluorinated ethylene propylene material, a perfluoroalkoxy alkane material, a modified PTFE material, or a combination thereof.

5. The low friction roller liner of claim 1, wherein the second inner layer comprises a polytetrafluoroethylene material or a mixture of a polytetrafluoroethylene material and a fluorinated ethylene propylene material, a perfluoroalkoxy alkane material, a modified PTFE material.

6. The low friction roller liner of claim 1, further comprising a wear rating of at least about 32,000, where the wear rating is equal to the number of rotations completed before failure in a Tribometer Test and failure is defined as a 50% increase in COF versus steady-state value during the Tribometer test.

7. The low friction roller liner of claim 1, further comprising a first outer layer thickness ratio $FOL_T/CL_T$ of at least about 0.02 and not greater than about 0.4, where $FOL_T$ is equal to the thickness of the first outer layer and $CL_T$ is equal to the thickness of the core layer.

8. The low friction roller liner of claim 1, further comprising a second outer layer thickness ratio $SOL_T/CL_T$ of at least about 0.02 and not greater than about 0.4, where $SOL_T$ is equal to the thickness of the second outer layer and $CL_T$ is equal to the thickness of the core layer.

9. The low friction roller liner of claim 1, further comprising a first inner layer thickness ratio $FIL_T/CL_T$ of at least about 0.02 and not greater than about 0.4, where $FIL_T$ is equal to the thickness of the first inner layer and $CL_T$ is equal to the thickness of the core layer, and a second inner layer thickness ratio $SIL_T/CL_T$ of at least about 0.02 and not greater than about 0.4, where $SIL_T$ is equal to the thickness of the second inner layer and $CL_T$ is equal to the thickness of the core layer.

10. A low friction roller liner for a printer assembly, wherein the low friction roller liner comprises:
a core layer comprising a polyimide material;
a first outer layer overlying a first surface of the core layer, wherein the first outer layer comprises at least one of a fluorinated ethylene propylene material, a perfluoroalkoxy alkane material, a modified PTFE material, or a combination thereof;
a second outer layer overlying the first outer layer, wherein the second outer layer comprises a polytetrafluoroethylene material or a mixture of a polytetrafluoroethylene material and a fluorinated ethylene propylene material, a perfluoroalkoxy alkane material, a modified PTFE material;
a first inner layer overlying a second surface of the core layer, wherein the second surface is opposite of the first surface, wherein the first inner layer comprises at least one of a fluorinated ethylene propylene material, a perfluoroalkoxy alkane material, a modified PTFE material, or a combination thereof; and
a second inner layer overlying the first inner layer, wherein the second inner layer comprises a polytetrafluoroethylene material or a mixture of a polytetrafluoroethylene material and a fluorinated ethylene propylene material, a perfluoroalkoxy alkane material, a modified PTFE material.

11. The low friction roller liner of claim 10, wherein the first outer layer has a melt flow rate of at least about 2 g/10 min at 372° C.

12. The low friction roller liner of claim 10, wherein the first outer layer has a surface coefficient of friction of not greater than about 0.2.

13. The low friction roller liner of claim 10, wherein the first inner layer has a melt flow rate of at least about 2 g/10 min at 372° C.

14. The low friction roller liner of claim 10, wherein the first inner layer has a surface coefficient of friction of not greater than about 0.2.

15. The low friction roller liner of claim 10, further comprising a wear rating of at least about 32,000, where the wear rating is equal to the number of rotations completed before failure in a Tribometer Test and failure is defined as a 50% increase in COF versus steady-state value during the Tribometer test.

16. The low friction roller liner of claim 10, further comprising a first outer layer thickness ratio $FOL_T/CL_T$ of at least about 0.02 and not greater than about 0.4, where $FOL_T$ is equal to the thickness of the first outer layer and $CL_T$ is equal to the thickness of the core layer.

17. The low friction roller liner of claim 10, further comprising a second outer layer thickness ratio $SOL_T/CL_T$ of at least about 0.02 and not greater than about 0.4, where $SOL_T$ is equal to the thickness of the second outer layer and $CL_T$ is equal to the thickness of the core layer.

18. The low friction roller liner of claim 10, further comprising a first inner layer thickness ratio $FIL_T/CL_T$ of at least about 0.02 and not greater than about 0.4, where $FIL_T$ is equal to the thickness of the first inner layer and $CL_T$ is equal to the thickness of the core layer, and a second inner layer thickness ratio $SIL_T/CL_T$ of at least about 0.02 and not greater than about 0.4, where $SIL_T$ is equal to the thickness of the second inner layer and $CL_T$ is equal to the thickness of the core layer.

19. A printer assembly comprising:
a printer fuser printer roller; and a free belt slip printer roller comprising low friction roller liner, wherein the low friction roller liner comprises:
a core layer comprising a polyimide material;
a first outer layer overlying a first surface of the core layer, wherein the first outer layer comprises a fluoropolymer material, and wherein the first outer layer has a melt flow rate of at least about 2 g/10 min at 372° C.;
a second outer layer overlying the first outer layer, wherein the second outer layer comprises a fluoropolymer material distinct from the fluoropolymer material of the first outer layer and wherein the first outer layer has a surface coefficient of friction of not greater than about 0.2;
a first inner layer overlying a second surface of the core layer, wherein the second surface is opposite of the first surface, wherein the first inner layer comprises a fluoropolymer material, and wherein the first inner layer has a melt flow rate of at least about 2 g/10 min at 372° C.; and
a second inner layer overlying the first inner layer, wherein the second inner layer comprises a fluoropolymer material distinct from the fluoropolymer material of the first inner layer and wherein the first inner layer has a surface coefficient of friction of not greater than about 0.2.

20. The printer assembly of claim 19, wherein the first outer layer comprises at least one of a fluorinated ethylene propylene material, a perfluoroalkoxy alkane material, a modified PTFE material, or a combination thereof.

* * * * *